United States Patent [19]

Jaffe

[11] 4,015,998

[45] Apr. 5, 1977

[54] 2,9-DICHLOROQUINACRIDONE PIGMENT COMPOSITIONS

[75] Inventor: Edward Ephraim Jaffe, Wilmington, Del.

[73] Assignee: E. I. Du Pont de Nemours and Company, Wilmington, Del.

[22] Filed: Sept. 24, 1975

[21] Appl. No.: 616,378

[52] U.S. Cl. .................. 106/288 Q; 260/279 QA; 106/300

[51] Int. Cl.² ....................................... C09B 48/00

[58] Field of Search .......... 260/279 QA; 106/288 Q

[56] References Cited

UNITED STATES PATENTS

| | | | |
|---|---|---|---|
| 3,157,659 | 11/1964 | Deuschel et al. | 260/279 |
| 3,577,379 | 5/1971 | Sandler et al. | 260/40 |

FOREIGN PATENTS OR APPLICATIONS

| | | |
|---|---|---|
| 229,454 | 9/1963 | Austria |
| 737,025 | 2/1970 | Belgium |
| 405,560 | 7/1966 | Switzerland |
| 896,916 | 5/1962 | United Kingdom |

OTHER PUBLICATIONS

Tagaki et al., Chemical Abstracts, vol. 70, 38,875x (1969).

*Primary Examiner*—Donald G. Daus
*Assistant Examiner*—Diana G. Rivers

[57] ABSTRACT

The disclosure teaches the preparation of a unique 2,9-dichloroquinacridone which provides a heat stable, highly dispersible magenta colorant suitable for use in plastics and the like where heat stability and lightfastness are necessary. The disclosure further teaches a pigmentary composition wherein the unique 2,9-dichloroquinacridone is combined with molybdate orange pigment to give a true red pigment of superior intensity, lightfastness and heat stability.

5 Claims, No Drawings

2,9-DICHLOROQUINACRIDONE PIGMENT COMPOSITIONS

BACKGROUND OF THE INVENTION

This invention relates to compositions which possess unique pigmentary properties. The compositions of this invention consist of a 2,9-dichloroquinacridone of unique polymorphic makeup and of such 2,9-dichloroquinacridone in combination with a molybdate orange pigment.

Quinacridone as a compound had been successfully synthesized in the early nineteen hundreds but it was not until 1955 that a synthesis was developed which would produce quinacridone in a commercially useful pigmentary form. This pioneering work was done by W. S. Struve and is disclosed in U.S. Pat. No. 2,821,529. Following in the wake of Struve have been numerous patents including some which disclose 2,9-dichloroquinacridone such as U.S. Pat. No. 3,157,659 to Deuschel et al. The Deuschel et al. patent discloses various polymorphs of 2,9-dichloroquinacridone but does not teach the specific composition discovered by me. In addition, various methods have been developed to improve the processes for the production of pigmentary quinacridone. Representative of such patents is U.S. Pat. No. 3,030,370 to J. Jackson. With the burgeoning use of synthetic pigmentary materials to color goods of all kinds particularly high temperature plastics and polymers, the demands for more durable and intense as well as lower cost pigments has been ever increasing. The 2,9-dichloroquinacridone which I have discovered adds another chapter to the development of this family of pigments.

The other component of the two component pigment compositions of this invention is a molybdate orange pigment or a silica coated molybdate orange pigment such as is taught in U.S. Pat. Nos. 3,370,971 and 3,369,133 to H. R. Linton and 3,567,477 to J. F. Higgins.

SUMMARY OF THE INVENTION

This invention relates to a new composition of 2,9-dichloroquinacridone characterized by the following 20 values of its powder diffraction pattern:
Strong band at 27.8°;
Medium band at 5.3°, 15.2° and 23.2°;
Weak band at 14.0°, 16.5°, 19.2°, 21.3° and 22.8°.

This invention also relates to a pigmentary composition containing from 50 to 3% by weight of the 2,9-dichloroquinacridone as defined in the preceding paragraph in combination with from 97 to 50% by weight of molybdate orange pigment preferably a molybdate orange which is encapsulated in dense amorphous silica and identified by the Colour Index Number C.I. 77605.

Pigmentary compositions wherein from 25 to 5% by weight is the 2,9-dichloroquinacridone and from 75 to 95% by weight of molybdate orange or silica encapsulated molybdate orange are preferred because of the ease of dispersibility and intensity of the resultant compositions.

DETAILED DESCRIPTION OF THE INVENTION

The subject of this invention is a 2,9-dichloroquinacridone which can be identified by its unique X-ray diffraction pattern and which possesses surprisingly good dispersibility when compared with previously known 2,9-dichloroquinacridones when employed in such demanding applications such as automotive paints and polymeric products. The term polymeric products includes products made from materials such as polystyrene, polypropylene, polyvinylchloride, ABS and the like. In addition the 2,9-dichloroquinacridone shows outstanding heat stability in such compositions and further provides unique blendability characteristics with molybdate orange pigments and silica encapsulated molybdate orange pigments. By heat stability is meant that the 2,9-dichloroquinacridone and its mixture with molybdate orange do not discolor or degrade noticeably when exposed to temperatures as high as 322° C. This property makes the 2,9-dichloroquinacridone of this invention of particular utility in the coloring of plastics which encounter high temperatures during fabrication.

The 2,9-dichloroquinacridone of this invention is prepared by ball milling a conventional 2,9-dichloroquinacridone in crude γ or a mixture of β and γ forms in the presence of aluminum sulfate $Al_2(SO_4)_3$·15–18$H_2O$, and tetracloroethylene followed by extraction in dilute sulfuric acid to obtain 2,9-dichloroquinacridone of outstanding dispersibility in plastics. The conventional 2,9-dichloroquinacridone starting material can be prepared by processes well known in the art such as are taught in U.S. Pat. No. 3,157,659 or it can be purchased if desired.

As stated above, the 2,9-dichloroquinacridone of this invention is characterized by a 20 X-ray diffraction pattern having a strong band at 27.8°; medium bands at 5.3°, 15.2° and 23.2°; and weak bands at 14.0°, 16.5°, 19.2°, 21.3° and 22.8°.

From this X-ray pattern it is believed that the 2,9-dichloroquinacridone of this invention is a mixture of γ and β polymorphs in which the former predominates.

In addition the 2,9-dichloroquinacridone of this invention when dispersed in polystyrene, other resins or other automotive finishes and extended with titanium dioxide has a unique absorption spectrum. For example, the reflectance curve of said extended dispersion shows the major longest wavelength band centered at 575 nm compared with other quinacridones such as β-quinacridone which shows a corresponding band at 577 nm with a 10 nm difference at the widest separation of the sloping curves. The 2,9-dichloroquinacridone shows a steeper slope at shorter wavelengths. In contrast, the 2,9-dimethylquinacridone shows a long wavelength maximum at 564 nm. The 2,9-dichloroquinacridone of this invention has a maximum of the corresponding band shifted 11 nm to longer wavelengths, shows a much steeper slope and actually crosses the curve of 2,9-dimethylquinacridone.

The spectroscopic behavior makes the 2,9-dichloroquinacridone composition of this invention when combined with a molybdate orange pigment which shows nearly complete absorption below 570 nm a unique magenta pigment of surprising intensity and lightfastness. Since intensity of blends is of great interest in plastics and in industrial paints, the unique light absorption characteristics of the pigment of this invention in combination with its other desirable attributes such as its heat stability and dispersibility make it a particularly valuable pigment in these types of applications.

The molybdate orange pigment can be prepared by procedures well known to the art or commercially available pigments such as molybdate orange YE 698-D or Krolor Orange R, KO-786-D, molybdate orange sold by E. I. du Pont de Nemours and Company, can be used. As indicated above, these molybdate oranges are red-shade orange pigments with a Color Index No. 77605.

The 2,9-dichloroquinacridone of this invention can be prepared according to the following technique.

EXAMPLE 1

A ball mill with an internal diameter of about 24 inches and a total capacity of about 60 gallons is charged with 1000 parts of "Cyl-pebs" (cylindrical bars of iron approximately one-half inch in diameter and one-half inch long) and 100 parts of "twenty penny" nails. Eleven parts of crude 2,9-dichloroquinacridone is charged to the ball mill together with 43.5 parts of commercial aluminum sulfate, $Al_2(SO_4)_3\cdot 15-18H_2O$, and about 1.6 parts of tetrachloroethylene. The mill is rotated at a speed of about 40 rpm (about 74% of critical speed) for 9 hours at a temperature of about 40° C., after which the mixture of pigment and aluminium sulfate is discharged from the mill through a screen which retains the "Cyl-pebs" and nails. Then 126 parts of the pigment and aluminum sulfate mixture is added to a stirred solution made by adding 6.8 parts concentrated sulfuric acid to 320 parts water. While stirring the mixture is heated with open steam to 88°–93° C. and kept at this temperature for 3 hours. Cold water is added to cool the mixture to about 70° C. The solid is separated by filtration and washed with hot water until the filtrate is essentially sulfate free and neutral to litmus paper. After drying, 24.5 parts of an intense magenta 2,9-dichloroquinacridone pigment is obtained. The 2,9-dichloroquinacridone pigment obtained by following the above procedure has an average particle size of less than about $0.1\mu$ and is characterized by the following X-ray diffraction pattern: showing the following 20 values strong at 27.8°; medium bands at 5.3°, 15.2°, and 23.2°; and weak bands at 14.0°, 16.5°, 19.2°, 21.3° and 22.8°. In addition, the pigment of this invention is readily identified when dispersed in a polymeric composition by its intense magenta color.

From the above X-ray pattern, it is believed that the pigment produced is a mixture of $\gamma$ and $\beta$ 2,9-dichloroquinacridone in which the former predominates. That is at least 50% by weight and up to 97% by weight is in the $\gamma$ form with the remainder being $\beta$. For purposes of this invention it will be understood that the $\gamma$-phase discussed herein is the same as is described in U.S. Pat. No. 3,157,659, but the $\beta$-phase component of the 2,9-dichloroquinacridone of this invention is called the $\alpha$-phase in U.S. Pat. No. 3,157,659.

It will be noted that the procedure of Example 1 provides a product that is dispersible in plastics without any further treatment steps or additives to obtain satisfactory dispersibility.

It will be noted that the pigment-aluminum sulfate mixture in tetrachloroethylene has been milled for 9 hours which is the optimum milling time. A shorter milling time can be employed but will result in a product of lower ultimate strength. A longer milling time up to 12 hours can be employed, but milling for more than 12 hours will adversely affect dispersibility of the product.

The properties of the 2,9-dichloroquinacridone pigment of this invention can be demonstrated by dry blending the 2,9-dichloroquinacridone, or other pigment, with or without one extender such as titanium dioxide, and a solid resin. The mixture is then subjected to vigorous stirring until homogeniety has been achieved. This blending operation may be carried out in normally employed blending equipment such as a ribbon blender, Banbury mixer, Baker-Perkins mixer, two roll mill and the like. The blender mixture is then injection molded into chips at a temperature above the softening temperature of the plastic. The following examples show the use of the pigment of this invention with conventional pigments in various polymer systems.

EXAMPLE 2

One thousand one hundred parts of polystyrene pellets are mixed with 11 parts pigmentary titanium dioxide and 1.1 grams of quinacridone pigment. The mixture is tumbled in a closed container to obtain a reasonably uniform blend. The mixture is then processed through a Banbury mixer (size B by Ferro Birmingham Company) at 120° C. to obtain a uniform blend of resin and pigment. The resulting blend is chopped into a colored coarse powder and is then injection molded into five sets of chips at the following temperatures: 200° C., 230° C., 260° C., 290° C. and 320° C. The degree of degradation undergone by the pigment during the extruding operation is determined by comparing the colors of the chips at the above temperatures. The test results are as follows:

| Pigment in Composition | Extrusion temperatures ° C. | | | | |
|---|---|---|---|---|---|
| | 200 | 230 | 260 | 290 | 320 |
| 2,9-dichloroquinacridone of Example 1 | Bluish red | 10 | 10 | 9 | 8 |
| 2,9-dimethylquinacridone | Bluish pink | 10 | 8 | 7 | 6 |
| Unsubstituted quinacridone | Red | 8 | 3 | 2 | 0 |

The color changes at the four higher temperatures are compared either visually or by obtaining reflectance spectra and compared with the color of the chip extruded at 200° C. A rating of 10 indicates complete color stability at the temperature indicated, 8 indicates slight change, 6 indicates considerable change, 2 indicates a very high degree of degradation and 0 indicates complete failure of the colorant.

As can be seen from the data, the pigment of Example 1 is far superior to commercially used pigments.

In addition to the observation of color change at the various extrusion temperatures, the chips are also observed under ultraviolet light. Under ultraviolet light the chips pigmented with quinacridone exhibit marked fluorescence which increases in intensity with increasing temperature. 2,9-Dimethylquinacridone is similarly affected but to a lesser degree and the 2,9-dichloroquinacridone of Example 1 shows essentially no fluorescence, above the background of emission due to the resin itself processed at higher temperatures, particularly 320° C. Increased fluorescence is indicative of increased pigment solubility in the resin, which of course is undesirable.

EXAMPLE 3

One thousand two hundred parts of ABS pellet resin is mixed with 24 parts pigmentary titanium dioxide and 0.6 part of the 2,9-dichloroquinacridone of Example 1. The mixture is first tumbled and is then dispersed in a Banbury mixer as described in Example 2. After injection molding at 200° C. and 290° C. chips are examined for color change. The chips are a bright bluish-red color, definitely superior in heat stability compared with similarly prepared chips employing 2,9-dimethylquinacridone as the colorant. The 2,9-dimethylquinacridone undergoes a color change to a yellowed hue when processed at the high temperature.

EXAMPLE 4

Ninety-five parts of polystyrene is added to a two roller mill, the rolls of which are rotated at 35 and 45 rpm and are heated to 107° C. When the polystyrene has softened, five parts of the 2,9-dichloroquinacridone of Example 1 is added and blending is continued until a uniform blend is obtained. A second polystyrene blend containing 20% Krolor (KO-786-D), silica encapsulated molybdate orange, is prepared. The two polystyrene blends are incorporated and blended with ABS resin in a Banbury mixer at 200° C. in a ratio of 12% 2,9-dichloroquinacridone of Example 1 and 88% Krolor (KO-786-D) to give a total pigment concentration per hundred weight of resin of 5.0. The resulting product, very intense red in color, is chopped into a coarse powder and injection molded at 200° C., 230° C., 260° C. and 290° C. The above procedure is also repeated but substituting 2,9-dimethylquinacridone and unsubstituted quinacridone for the 2,9-dichloroquinacridone of Example 1. To approximate the color obtained with the 2,9-dichloroquinacridone/Krolor blend of this invention, a similarly prepared 5/95 blend of β quinacridone/Krolor and a 17/83 blend of a 2,9-dimethylquinacridone/Krolor is prepared. The β quinacridone and 2,9-dimethylquinacridone compositions described above are less intense and less heat stable than the composition of this invention.

The heat stability of the three pigmented polymer systems are compared at the various extrusion temperatures and the results are as follows:

| Pigment in Composition | Extrusion Temperature ° C. | | | |
|---|---|---|---|---|
| | 200 | 230 | 260 | 290 |
| 2,9-dichloroquinacridone of Example 1/Molybdate Orange | Red, Very Intense | 10 | 9 | 8 |
| 2,9-dimethylquinacridone/ Molybdate Orange | Red, Med. Intensity | 10 | 9 | 7 |
| β-Quinacridone/Molybdate Orange | Red, Relatively dull | 9 | 8 | 6 |

The meaning of the ratings is described above. As can be seen the composition of this invention retains its intensity and pigmentary quality with little degradation even at a temperature of 290° C. in the ABS resin system.

The above procedure can be repeated by substituting a red shade molybdate orange which has not been treated to provide a dense amorphous silica coating thereon. Such substitution would provide a composition with a similar dispersibility and intensity as the composition containing the Krolor but, of course, would not be as heat stable.

EXAMPLE 5

A mixture of 8000 parts of commercial acetal molding resin, 40 parts of pigmentary rutile titanium dioxide and 0.4 parts of the 2,9-dichloroquinacridone of Example 1 is prepared by drum tumbling for 50 minutes. The mixture is extruded at a temperature between 185° and 195° C. into strands. The strands are then cut into granules and molded into step chips at 200° C. The chips are bluish-red in color which is superior in depth of color, cleaness of hue and heat stability as compared with similarly prepared chips using 2,9-dimethylquinacridone as the colorant. The heat stability of the pigment of Example 1 is even more pronounced when no titanium dioxide is employed.

EXAMPLE 6

Six thousand eight hundred parts of nylon molding powder is tumbled with 34 parts rutile titanium dioxide and 3.4 parts of 2,9-dichloroquinacridone of Example 1. The resulting mixture is compounded through an extruder barrel and die at a temperature of 270° C. The nylon strands from the extruder are cut into granules and molded into step chips at 270° C. The chips are a clean bluish-red color, definitely superior to similarly prepared nylon chips using 2,9-dimethylquinacridone as colorant. The latter undergoes a marked color change to a yellower hue and exhibits intense fluorescence under ultraviolet light.

EXAMPLE 7

Eight parts of powdered polypropylene and two parts of the 2,9-dichloroquinacridone are mixed in a can with 0.1 part stearic acid and small amounts of additives such as antioxidants. The mixture is shaken on a Red Devil paint shaker for 15 minutes and is then further blended on a two roll mill to give a 20% pigment concentrate in polypropylene. This concentrate is then blended in a Banbury mixer with additional polypropylene and a 50% concentrate of titanium dioxide in polypropylene to produce a blend containing 0.1 part per hundred parts of finished blend of the 2,9-dichloroquinacridone of Example 1, 1.0 part per hundred parts of finished blend of titanium dioxide and the remainder polypropylene. After removal from the Banbury mixer the material is cooled, but into walnut size lumps with a shear, granulated and put through a ¼ inch screen. This product is then injection molded at five temperatures ranging from 200° to 320° C. The heat stability of this polypropylene chip colored with the 2,9-dichloroquinacridone for Example 1 is compared with similarly prepared chips using Cromophthal Red 3B (a diamino dianthraquinonyl pigment manufactured by Ciba-Geigy), a pigment frequently used in polypropylene applications. The results of this comparison are as follows:

| Pigment in Composition | Extrusion Temperature ° C. | | | | |
|---|---|---|---|---|---|
| | 200 | 230 | 260 | 290 | 320 |
| 2,9-dichloroquinacridone of Example 1 | Bluish-Red | 10 | 10 | 9.5 | 8.5 |
| Cromophthal Red 3B | Brownish-Red | 10 | 9 | 6 | 5 |

The meaning of the ratings is the same as described earlier. In addition to the superior heat stability of the composition employing the pigment of this invention, the pigmented composition of this invention also shows a substantial advantage in lightfastness as determined by exposure in a fadometer as shown in the following table

| Pigment in Composition | Time of Exposure in Hours | | |
|---|---|---|---|
| | 100 | 200 | 300 |

| Pigment in Composition | Time of Exposure in Hours | | |
|---|---|---|---|
| 2,9-dichloroquinacridone of Example 1 | 10 | 10 | 9.5 |
| Cromophthal Red 3B | 10 | 8 | 6 |

A lightfastness rating of 10 means no change on exposure, while a rating of 6 indicates considerable change and 0 designates complete failure.

EXAMPLE 8

The following ingredients are blended in a Banbury mixer:
950 parts polypropylene,
4.12 parts of a 20% by weight concentrate of the 2,9-dichloroquinacridone of Example 1 in polypropylene and prepared as described above,
36.2 parts of a 20% concentrate of Molybdate Orange (Krolor KO-786-D) in polypropylene,
12 parts of 0.1 part per hundred carbon black in polypropylene.

A similar blend is made but substituting 8.8 parts of a 20% concentrate of Cromophthal Red 3B in place of the 2,9-dichloroquinacridone concentrate. Then the blends injection molded at temperature ranging from 230° to 320° C. The chips of the two blends extruded at 230° C. are very close in color and intensity, demonstrating the considerable economic advantage of the pigment of this invention which requires less than half the amount of 2,9-dichloroquinacridone of this invention as compared to the amount of Cromophthal Red 3B that is required. In addition, the pigment blend of this invention shows superior heat stability and lightfastness.

EXAMPLE 9

The superior dispersibility of the 2,9-dichloroquinacridone over 2,9-dichloroquinacridone prepared by known methods and of other commercially available 2,9-dimethylquinacridone pigments can be demonstrated as follows: 22 parts of white soft polyvinylchloride was mixed with 0.1 part of the 2,9-dichloroquinacridone of Example 1 in a small glass jar by stirring with a spatula and subsequent rolling of the jar for 1 minute on a roller mill. The resulting mixture is added to 199 parts of white soft polyvinylchloride which has been softened by milling for 30 seconds on a two roll mill, the rolls of which are preheated to about 150° C. and are rotating at 15 rpm. After 15 seconds of milling the total charge is given five alternate cuts and the material is taken off the mill, allowed to cool and small exhibits are cut from the center of the resulting sheet. The remainder of the sheet is returned to the mill for an additional 10 alternate cuts and exhibits are similarly prepared. Dispersibility is judged by degree of color development and the degree of specking and streaking in the exhibit. In all of these respects the 2,9-dichloroquinacridone of Example 1 is vastly superior to commercial 2,9-dimethylquinacridone or 2,9-dichloroquinacridone developed in the presence of strong, i.e., 40%, sulfuric acid. The commercially available 2,9-dimethylquinacridone and the 2,9-dichloroquinacridone developed in a strong sulfuric acid developed approximately one-half to one-fifth the color strength of the 2,9-dichloroquinacridone of this invention. This assessment of color strength applies equally to the minimum work dispersion (five cuts) as well as the dispersion prepared with a greater dispersive effort (15 cuts).

What is claimed is:
1. Pigmentary 2,9-dichloroquinacridone characterized by 2θ values of its X-ray powder diffraction pattern having a strong band at 27.8°, medium bands at 5.3°, 15.2° and 23.2° and weak bands at 14.0°, 16.5°, 19.2°, 21.3° and 22.8°.
2. Pigmentary composition containing from 50 to 3% by weight of the 2,9-dichloroquinacridone of claim 1 in combination with 50 to 97% by weight of molybdate orange.
3. A pigmentary composition of claim 2 in which the molybdate orange is encapsulated in dense amorphous silica.
4. A pigmentary composition of claim 2 containing from 25 to 5% by weight of the 2,9-dichloroquinacridone of claim 1 in combination with 75 to 95% by weight of molybdate orange.
5. A pigmentary composition of claim 4 in which the molybdate orange is encapsulated in dense amorphous silica.

* * * * *